United States Patent [19]

Nienaber

[11] Patent Number: 4,611,230

[45] Date of Patent: Sep. 9, 1986

[54] VERTICAL VIDEO CENTERING CONTROL SYSTEM

[75] Inventor: David K. Nienaber, Des Plaines, Ill.

[73] Assignee: Zenith Electronics Corporation, Glenview, Ill.

[21] Appl. No.: 683,125

[22] Filed: Dec. 18, 1984

[51] Int. Cl.[4] .................. H04N 5/04; H04N 7/00
[52] U.S. Cl. ........................... 358/158; 358/154; 358/159; 375/120; 331/20; 331/25
[58] Field of Search .............. 358/148, 149, 150, 154, 358/158, 159; 331/20, 25; 375/120; 315/387, 397, 398

[56] References Cited

U.S. PATENT DOCUMENTS

| | | | |
|---|---|---|---|
| 4,025,951 | 5/1977 | Eckenbrecht | 358/158 |
| 4,231,064 | 10/1980 | Uchida | 358/158 |
| 4,298,890 | 11/1981 | Lai et al. | 358/158 |
| 4,521,745 | 6/1985 | Falconer | 375/120 |

Primary Examiner—James J. Groody
Assistant Examiner—Michael D. Parker

[57] ABSTRACT

Phase shifting means are provided for altering the phase relationship between a vertical sync signal the resulting vertical retrace and video information in a video display environment. The video display is adjustably repositioned both up and down on the display raster by means of phase adjustment circuitry. A single loop having first and second delay circuits provides phase shifting. The output vertical sync signal lags or leads in phase the originally received vertical sync signal by the difference between the first delay and second delay values. The first delay is interposed between the incoming vertical sync signal and the phase locked loop system. The second delay circuit is interposed in the loop between the output vertical sync signal and the phase detector for locking the output vertical sync signal in phase with the delayed original sync signal. Either or both of the first and second delay circuits may be adjustable to vary the amount of phase shift introduced between the original vertical sync signal and the output vertical sync signal. When the phase of the output signal leads the phase of the original sync signal, the video display picture is shifted downward on the display raster. When the phase of the output signal lags the phase of the original vertical sync signal, the video display picture is shifted upward on the display raster.

8 Claims, 2 Drawing Figures

4,611,230

VERTICAL VIDEO CENTERING CONTROL SYSTEM

BACKGROUND OF THE INVENTION

The present invention is generally directed toward improvements in the television and video display arts. More particularly, the present invention is directed to a vertical video centering control system for providing a vertical centering function for a displayed video signal.

Traditionally, a television signal is displayed on a raster display with progressive horizontal line scanning in which successive horizontal lines of video are written on the screen from left to right, top to bottom. A vertical retrace function returns the scanning electron beam from the bottom right to the top left of the raster, typically in response to a vertical sync signal. That is, the horizontal line scanning is discontinued at some point in the lower right hand corner of the display screen and initiated in the upper left hand corner in response to the recognition of a vertical synchronization (sync) signal. The vertical position of the video on the display screen depends in part upon the relationship between the vertical sync signal and the video information to be displayed and also in part on the positioning of the display raster with respect to the overall display screen.

In N.T.S.C. standard television signals, vertical sync signals occur within a vertical blanking interval during which no video information is transmitted. In other applications, such as video monitors for computer related applications, a vertical sync signal is generally provided by the computer in accordance with the individual manufacturer's specifications and may or may not have video information immediately proceeding and following the actual vertical sync signal.

In standard television systems (N.T.S.C.) applications, vertical centering may not be considered critical, because the vertical blanking interval will typically extend for several horizontal lines on either side of the vertical sync signal so that no interference results in the displayed picture. However, with the advent of teletext and computer generated displays, use of greater portions of the available raster display is increasingly desirable. Unfortunately, in such applications the vertical timing information is typically provided by a vertical sync signal which is generally not standardized as to duration or exact time of initiation within any vertical field. Accordingly, it is desirable to provide a video monitor which is compatible with various systems and allows for the video display to be vertically centered when desired.

The positioning of a video display field on a video tube is also controlled in part by the video tube deflection yoke which controls the direction and movement of the raster tracing, scanning electron beam. It is well known in the art that some measure of vertical centering may be provided by introducing a D.C. offset into the deflection yoke to alter its reference or starting point and correspondingly shift the entire display raster on the display screen. However, this method traditionally creates undesirable effects on the linearity of the system and may be unsafe when accessible to the consumer.

An alternative method for providing some measure of vertical video centering is to shift the vertical sync signal with respect to the video information by delaying the sync signal. However, this allows solely for a video shift upward on the raster, because the vertical sync signal may be shifted in only one direction by delaying it.

Another method for shifting the sync signal with respect to the video signal is to delay each sync signal for approximately the duration for one vertical field interval so that each vertical sync pulse will be used to synchronize the succeeding field of video information. In such a system, the video may be moved both up and down on the display raster by delaying each sync pulse somewhat more or less than the typical duration of an entire vertical display field. However, undesirable effects may frequently be encountered when raster scanning is timed to the preceding field sync pulse while displaying video from a current vertical field.

Yet another method for providing some measure of vertical video centering is to delay the video information itself with respect to the sync pulse with the use of a long delay line. However, this is quite difficult and costly.

Accordingly, it is desirable to provide a system for allowing relatively easy vertical video centering, both up and down on the video display raster, without creating undesirable side effects on product safety, picture linearity, video bandwidth or video definition. Therefore, the principal object of the present invention is to provide a vertical video centering control system that generally overcomes the deficiencies of the prior art.

It is a futher object of the present invention to provide a vertical video centering control system which will allow the video information to be moved both up and down on the video display raster.

Still a further object of the present invention is to provide a phase locked loop system to shift existing sync signals within a vertical field interval to accomplish vertical centering.

BRIEF DESCRIPTION OF THE FIGURES

The features of the present invention are defined with particularity in the appended claims. However, the invention, together with the objects and advantages thereof, may best be understood when the following detailed description is taken in conjunction with the accompanying figures of which:

DETAILED DESCRIPTION OF THE INVENTION

Generally, the present invention may provide a system for advancing or delaying vertical retrace with respect to the video information in each vertical field interval without creating undesirable side effects. In one preferred embodiment, a single phase lock loop system adjusts the retrace timing with respect to the video information. A phase detector drives a voltage controlled oscillator (VCO) on response to the detected difference between the incoming sync, which may be variably delayed, and the VCO output, which may also be conditioned by a delay phase. In the preferred embodiment, when the incoming vertical sync signal is delayed less than the delayed VCO output which is also supplied to the phase detector, the VCO output will lead the incoming sync at its leading edge by the difference between the respective delays. Similarly, when the incoming vertical sync signal is delayed for a time greater than the delayed VCO output which is supplied to the phase detector, the leading edge of the VCO output will lag behind the leading edge of the incoming vertical sync.

Figure 1:
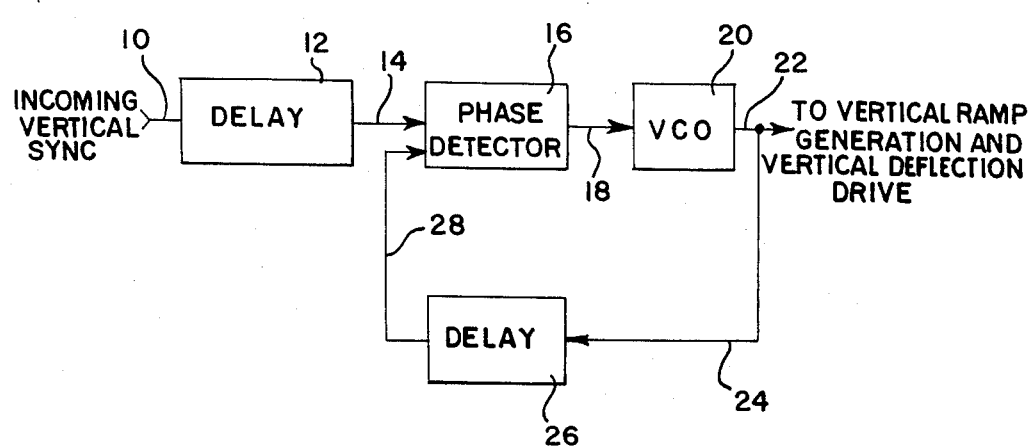
FIG. 1 is a schematic block diagram of a preferred embodiment of the present invention having a loop circuit system for providing vertical video centering.

More particularly, a preferred embodiment of the present invention is shown in the schematic block diagram of FIG. 1. An incoming vertical sync signal is received on a line 10 by a first delay circuit 12. The delay circuit 12 communicates it's output signal via a line 14 to a phase detector circuit 16 which communicates via a line 18 with a voltage controlled oscillator (VCO) 20. The output of VCO 20 on a line 22 may then be provided to vertical ramp generation and vertical deflection drive circuitry (not shown) to accomplish the necessary vertical timing for a video display raster. The output of VCO 20 on line 22 is also supplied via line 24 to a second delay circuit 26. The output of delay circuit 26 is provided via a line 28 as a second input to phase detector 16.

As is well known in the art, phase detector 16 generates an output on line 18 representational of the phase difference between the signals received on lines 14 and 28 as inputs to phase detector 16. The output on line 18 will then drive the voltage controlled oscillator 20 to appropriately alter its output on line 22, and correspondingly on line 24. Accordingly, the loop represented by line 18, VCO 20, line 24, delay 26, line 28 and phase detector 16 serves to correct any phase difference which may exist between the vertical sync signal received on line 14 and the signal on line 28.

Although it is envisioned that the present invention may be utilized in a preferred environment with a video monitor in conjunction with computers or other nonstandard television applications, the present invention may be readily used in any circuitry for which a separate vertical sync signal may be supplied or derived. For example, in a standard television receiver, the vertical sync signal may be separated and supplied to the circuitry of the preferred embodiment.

Referring once again to FIG. 1, the delay circuits 12 and 26 as illustrated therein may comprise typical RC networks for delaying the signals presented at their respective inputs. In the preferred embodiment of the present invention, either or both of delay circuits 12 and 26 may be adjustable. The difference between the delay values for delay circuits 12 and 26 determines the amount of shift which is introduced into the phase relationship of the VCO output with respect to the incoming vertical sync and video information. Accordingly, if both the delay circuits have fixed values, a fixed phase correction will be introduced in the VCO output signal. This will correspondingly effect a fixed change in vertical position for the video display on the display raster. However, the principal object of the present invention is to provide for adjustably shifting video information within a particular video display raster. Accordingly, by adjusting one or both of the delay values for the delay circuits 12 and 26, the video display may be desirably shifted in either vertical direction.

More particularly, when delay circuit 26 has a fixed value and delay circuit 12 is adjustable, the displayed picture may be readily moved both up and down in the video display raster. For example, when delay circuit 12 is adjusted for approximately a zero delay, the VCO output on line 22 will lead the vertical sync signal by a value approximately equal to the fixed delay of delay circuit 26. This is generally possible because of the action of phase detector 16 which attempts to match the phase relationship between the signals received on line 14 and 28. Accordingly, the output of the VCO 20 on lines 22 and 24 must lead the vertical sync signal present on line 14 by a value equal to the fixed delay value of delay circuit 26 so that the delayed signal present on line 28 will be approximately equal in phase to the signal present on line 14 as measured by phase detector 16. This is possible due to the action of the representational output of the phase detector 16 on line 18 as applied to the voltage controlled oscillator 20.

Alternatively, when the delay value of the delay circuit 12 is adjusted for maximum delay, the VCO output on line 22 to the vertical ramp generation and deflection drive circuitry will lag in phase by the amount that the delay introduced by delay circuit 12 is greater than the delay introduced by delay circuit 26. This is possible due to the general action of the phase locked loop presented by phase detector 16, voltage controlled oscillator 20 and delay circuit 26 as connected by lines 18, 22, 24 and 28.

Figure 2:
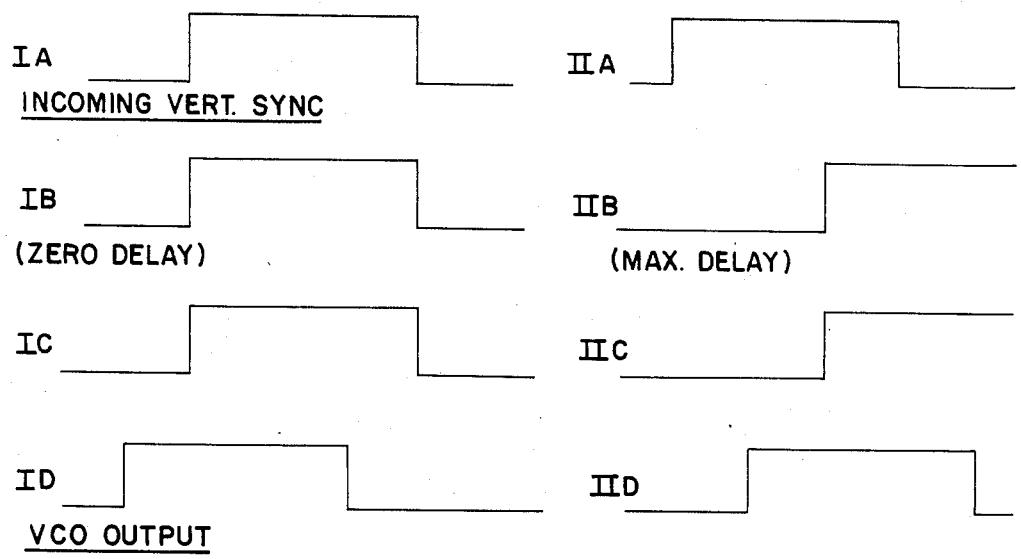
FIG. 2 is a representational timing diagram illustrating waveforms from various points in the circuitry of FIG. 1 for different circumstances.

The operation of the preferred embodiment of the present invention may be more fully appreciated by reference to accompanying FIG. 2. Therein is shown two sets of waveforms representing illustrative signals present at various points in the circuitry of FIG. 1. For example, waveform 1(A) may represent a typical incoming vertical sync signal. Waveform 1(B) may represent the output of delay circuit 12 when it is adjusted for approximately a zero delay so that waveforms 1(A) and 1(B) will be approximately in phase. Waveform 1(C) represents the output of delay circuit 26 on line 28 which is the delayed VCO output. Because of the action of phase detector 16 and voltage controlled oscillator 20, waveform 1(C) should be equal in phase to waveform 1(B), which is the other input to phase detector 16. Accordingly, the VCO output on line 22 as represented by waveform 1(D) must lead waveform 1(B) by a phase difference equal to the value of the delay introduced by delay circuit 26. This is shown in FIG. 2 as a phase comparison between waveforms 1(B), 1(C) and 1(D).

When the VCO output on line 22, which is used to drive the vertical ramp generation and vertical deflection drive circuitry, leads the incoming vertical sync in phase, the video picture will be shifted downward in the video raster display. This occurs because the vertical retrace function will be initiated earlier in each vertical field which will cause the vertical retrace to occur sooner with respect to the termination of the video information than would normally occur. Accordingly, any vertical blanking which would typically be present would be shifted to the top of the screen, and the video information would correspondingly begin farther down on the display raster.

Similarly, a delay may be introduced into the vertical sync signal to delay the vertical deflection drive signal generation. This is illustrated by waveform 2(A) in FIG. 2 which may represent a typical incoming vertical sync signal. Waveform II(B) may then represent an output of delay circuit 12 on line 14 when delay circuit 12 is adjusted for its maximum delay. Correspondingly, as mentioned above, waveform 2(C), which represents the output of delay circuit 26 on line 28, will be equal in phase to waveform 2(B) because of the action of phase detector 16. Accordingly, the VCO 20 output on line 22 as represented by waveform 2(D) must lead waveform 2(B) in phase by an amount equal to the value of the delay introduced by delay circuit 26, so that once it is delayed, the resulting waveform 2(C) on line 28 will be equal to phase to waveform 2(B) present on line 14 as detected by phase detector 16. Consequently, whenever the delay of circuit 12 exceeds that of circuit 26, the VCO output on line 22 will lag the incoming vertical sync in phase by a value equal to the difference between the delay value of delay circuit 12 and the delay value of delay circuit 26. The phase shift will generally approximates the magnitude of this "difference" value whether the VCO output leads or lags incoming vertical sync.

When the VCO output on line 22 lags in phase behind the incoming vertical sync signal on line 10, the video information will be shifted upward on the video display raster. This occurs because the vertical retrace signal generated in response to the pulse originated by VCO 20 on line 22 will occur later with respect to the video information in each vertical field than it would normally. Thus, any video blanking which is present would tend to be distributed along the bottom of the display raster and the video information will follow more closely upon the termination of the vertical retrace signal. Correspondingly, the displayed video information would be shifted upward on the displayed raster.

Those skilled in the art will appreciate that phase shifting to accomplish vertical centering according to the present invention is not entirely completed during a single vertical field interval. Rather, there is a "real time" correcting interval in which the phase lock loop represented by phase detector 16, VCO 20 and delay circuit 26 locks the vertical retracing signal onto the appropriately shifted phase.

Although described above in terms of preferred embodiment, the present invention may be utilized in a number of different situations and environments. The scope of the present invention is defined in the appended claims. Such changes, modifications and alterations as would be apparent to one skilled in the art and familiar with the teachings of the present invention are deemed to fall within the spirit and scope of the present invention.

What I claim is:

1. A vertical sync adjustment system for altering the phase of a vertical sync signal during a vertical field interval to accomplish vertical video centering on a display raster comprising:

first delay means for delaying a received vertical sync signal;

phase detector means for generating an output signal representational of the phase difference between said delayed vertical sync signal and a reference signal;

oscillator means coupled to said phase detector means and having a frequency which is controlled by said representational output signal to generate a phase modified vertical rate signal; and second delay means for delaying said phase modified vertical rate signal to generate said reference signal to be supplied to said phase detector means.

2. The system of claim number 1 wherein said first delay means is adjustable and said second delay means is fixed.

3. The system of claim number 1 wherein said first delay means is fixed and said second delay means is adjustable.

4. System of claim number 1 wherein said first delay means is adjustable and said second delay means is adjustable.

5. In a television system having vertical sync signals for generating vertical retrace timing for a raster scan display, vertical video centering means for advancing or delaying the initiation of the vertical retrace during the vertical field comprising:

first delay means for receiving said vertical sync signal and outputting said signal after a delay;

phase detector means adapted to receive said delayed vertical sync signal to generate an output representational of the phase difference between said delayed vertical sync signal and a reference signal;

oscillator means adapted to receive the output of said phase detector means to generate a shifted vertical rate signal having an oscillation frequency controlled by the output of said phase detector means; and second delay means adapted to receive said vertical rate signal and to provide a delayed vertical rate signal to be used as said reference signal to said phase detector means.

6. The system of claim number 5 wherein said first delay means is adjustable and said second means is fixed.

7. The system of claim number 5 wherein said first delay means is fixed and said second delay means is adjustable.

8. The system of claim number 5 wherein said first delay means is adjustable and said second delay means is adjustable.

* * * * *